(12) United States Patent
Drader et al.

(10) Patent No.: US 8,744,234 B2
(45) Date of Patent: Jun. 3, 2014

(54) APPARATUS AND METHOD FOR UTILIZING A FLASH LED AS A VIDEO INDICATOR LIGHT

(75) Inventors: Marc Drader, Waterloo (CA); James Alexander Robinson, Elmira (CA); Michael Lorne Purdy, Kitchener (CA)

(73) Assignee: BlackBerry Limited, Waterloo (CA)

( * ) Notice: Subject to any disclaimer, the term of this patent is extended or adjusted under 35 U.S.C. 154(b) by 556 days.

(21) Appl. No.: 12/713,625

(22) Filed: Feb. 26, 2010

(65) Prior Publication Data

US 2011/0211807 A1    Sep. 1, 2011

(51) Int. Cl.
*H04N 5/765* (2006.01)
*H04N 5/76* (2006.01)
*H04N 5/77* (2006.01)
*H04N 5/225* (2006.01)
*H04N 5/775* (2006.01)
*H04N 11/20* (2006.01)
*G06K 9/36* (2006.01)

(52) U.S. Cl.
USPC ........... 386/232; 386/200; 386/225; 386/228; 386/230; 386/231; 348/207.1; 348/220.1; 348/231.2; 348/441; 382/234; 382/236

(58) Field of Classification Search
USPC .............. 386/232, 200, 230, E5.002, E5.003, 386/225, 228, 231, 244, 328, E5.072; 348/207.1, 208.15, 220.1, 231.2, 441, 348/E5.042, E7.003; 382/234, 236; 713/2; 358/909.1
See application file for complete search history.

(56) References Cited

U.S. PATENT DOCUMENTS

| | | | |
|---|---|---|---|
| 5,448,320 A | 9/1995 | Sakai et al. | |
| 6,449,426 B1 * | 9/2002 | Suga et al. | 386/228 |
| 6,493,466 B1 * | 12/2002 | Honda et al. | 382/236 |
| 6,512,887 B2 | 1/2003 | Inoue et al. | |
| 6,854,902 B2 | 2/2005 | Marek | |
| 7,085,489 B2 | 8/2006 | Yamashita | |
| 7,236,698 B2 | 6/2007 | Tochigi et al. | |
| 7,312,821 B2 * | 12/2007 | Voss et al. | 348/220.1 |
| 7,792,409 B2 * | 9/2010 | Kimura | 348/207.1 |
| 2003/0013484 A1 | 1/2003 | Nishimura et al. | |
| 2004/0145675 A1 | 7/2004 | Kitada | |
| 2004/0196402 A1 | 10/2004 | Yoshida et al. | |
| 2005/0073727 A1 | 4/2005 | Park et al. | |
| 2006/0038916 A1 | 2/2006 | Knoedgen et al. | |
| 2007/0077046 A1 | 4/2007 | Lim | |
| 2007/0153495 A1 | 7/2007 | Wang et al. | |
| 2007/0269203 A1 | 11/2007 | Awazu | |
| 2008/0136961 A1 | 6/2008 | Latella et al. | |
| 2008/0180569 A1 * | 7/2008 | Imaida | 348/441 |
| 2009/0207301 A1 | 8/2009 | Fransson | |

FOREIGN PATENT DOCUMENTS

JP    2003-348211 A    12/2003

* cited by examiner

*Primary Examiner* — Daquan Zhao
*Assistant Examiner* — Syed Hasan

(57) ABSTRACT

A method and an apparatus providing a visual indication of the occurrence of video recording operations on an electronic device. The video recording operations including recording a plurality of frames according to a number of characteristics. The method comprising providing a time interval between the recording of two consecutive frames by modifying at least one of the characteristics of the video recording operations and providing the visual indication of video recording operations during the time interval.

15 Claims, 3 Drawing Sheets

APPARATUS AND METHOD FOR UTILIZING A FLASH LED AS A VIDEO INDICATOR LIGHT

BACKGROUND

1. Field

The disclosed and claimed concept relates generally to electronic devices and, more particularly, to methods for utilizing a flash LED as an indicator light during video recording on a handheld electronic device.

2. Background

Numerous types of handheld electronic devices are known. Examples of such handheld electronic devices include, for instance, personal data assistants (PDAs), handheld computers, two-way pagers, cellular telephones, and the like. Many handheld electronic devices also feature wireless communication capability, although many such handheld electronic devices are stand-alone devices that are functional without communication with other devices.

Some handheld electronic devices and other electronic devices employ small cameras that can take photographs and video images that are then stored on the electronic device. Such cameras typically are digital cameras that comprise a camera lens, a sensor, and a processor system, which may be manufactured and sold as a modular unit.

In many jurisdictions, a blinking visual indicator light is required to be provided on a video-recording device in order to warn persons nearby that the device is being used for video-recording. Video-recording devices, such as camcorders, commonly employ a dedicated "widespread" red LED which is visible to the public but does not generally affect the image being recorded as the light energy is spread over a large area. Use of such a dedicated widespread red LED on a handheld electronic device would occupy space on the device which is generally at a premium. Furthermore, use of such a dedicated LED would also add additional manufacturing and equipment costs that would be passed to the consumer.

BRIEF DESCRIPTION OF THE DRAWINGS

A full understanding of the disclosed and claimed concept can be gained from the following Description when read in conjunction with the accompanying drawings in which:

DESCRIPTION

The accompanying figures and the description that follows set forth the disclosed and claimed concept in its preferred embodiments. It is, however, contemplated that persons generally familiar with handheld electronic devices will be able to apply the novel characteristics of the structures and methods illustrated and described herein in other contexts by modification of certain details. Accordingly, the figures and description are not to be taken as restrictive on the scope of the disclosed and claimed concept, but are to be understood as broad and general teachings.

For purposes of the description hereinafter, the terms "upper", "lower", "right", "left", "vertical", "horizontal", "top", "bottom", and derivatives thereof shall relate to the disclosed and claimed concept as it is oriented in the figures.

Figure 1:
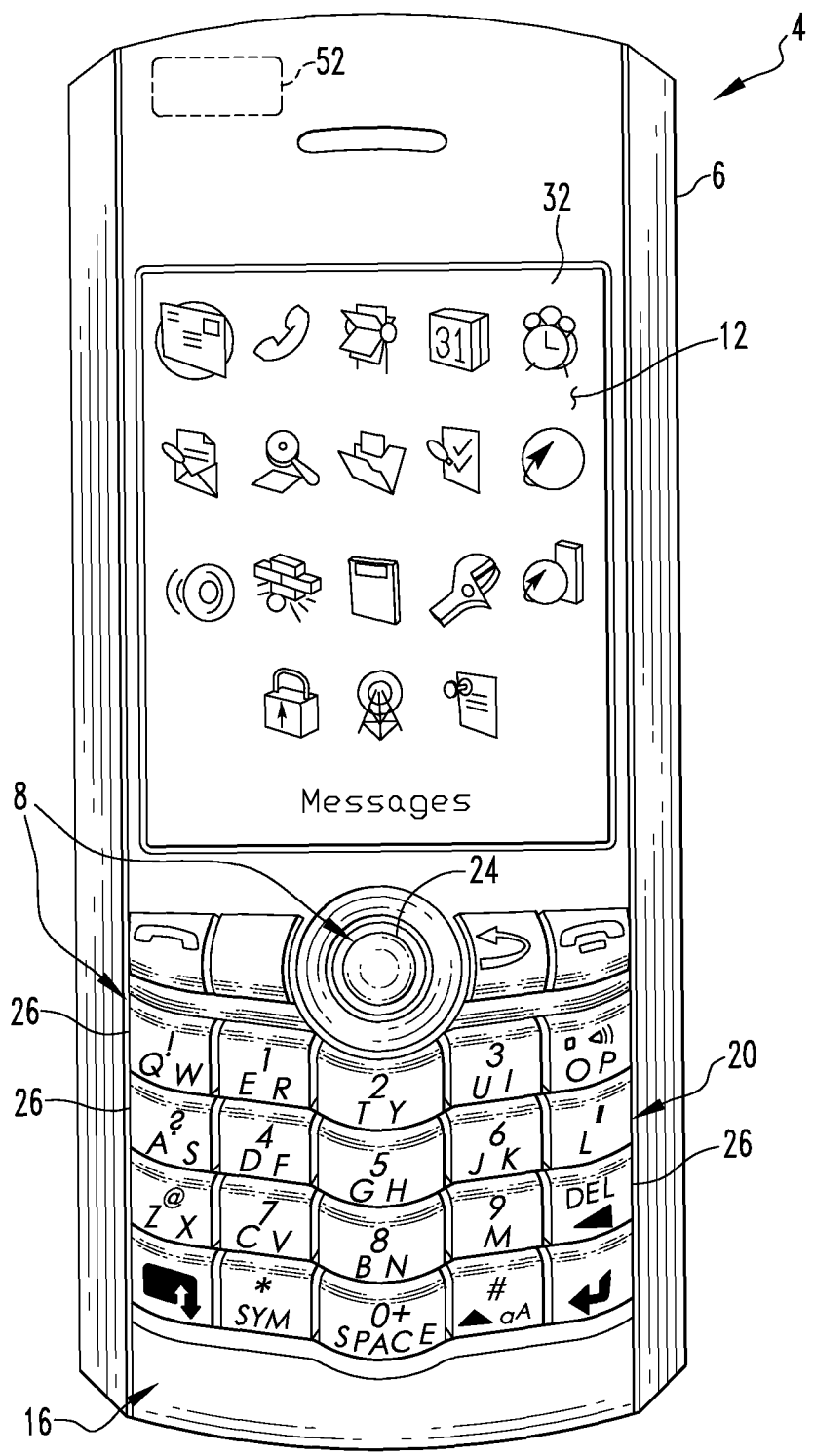
FIG. 1 is a front plan view of an illustrative handheld electronic device in accordance with the disclosed and claimed concept upon which is performed a method in accordance with the disclosed and claimed concept.
Figure 2:
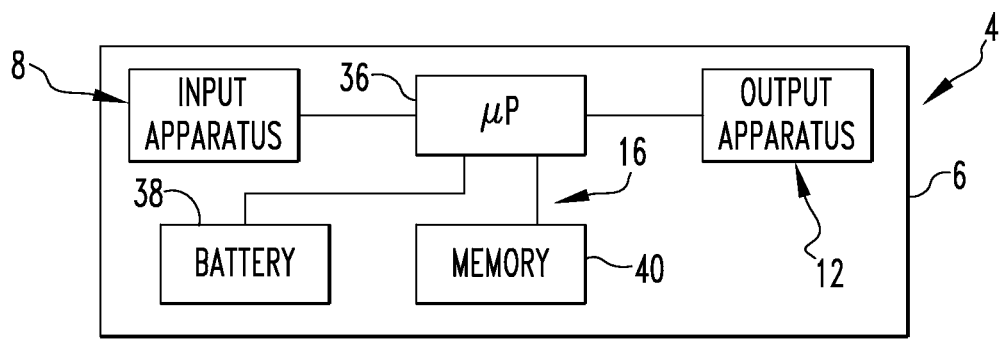
FIG. 2 is a schematic depiction of the handheld electronic device of FIG. 1.

An improved handheld electronic device 4 in accordance with the disclosed and claimed concept is indicated generally in FIG. 1 and is depicted schematically in FIG. 2. The electronic device 4 may be a handheld or other portable electronic device (e.g. and without limitation, a digital camera, a PDA, a cell phone, a digital watch, or a laptop computer). The electronic device 4 comprises a housing 6, and further comprises an input apparatus 8, an output apparatus 12, and a processor apparatus 16 disposed in the housing 6. The input apparatus 8 provides input to the processor apparatus 16. The processor apparatus 16 provides output signals to the output apparatus 12.

In the illustrative embodiment shown, input apparatus 8 comprises a keypad 20 and a trackball 24. The keypad 20 in the illustrative embodiment depicted herein comprises a plurality of keys 26 that are each actuatable to provide input to the processor apparatus 16. The trackball 24 is rotatable to provide navigational and other input to the processor apparatus 16, and additionally is translatable in a direction inwardly toward the electronic device 4 to provide other inputs, such as selection inputs. The trackball 24 is freely rotatable on the housing 6 and thus is able to provide navigational inputs in the vertical direction, i.e., the up-down direction, in the horizontal direction, i.e., the left-right (side to side) direction, as well as combinations thereof. In addition, the trackball 24 may be adapted to provide navigational inputs in diagonal directions. The keys 26 and the trackball 24 serve as input members which are actuatable to provide input to the processor apparatus 16. Alternative mechanisms for providing similar multi-directional navigation may be used in place of the trackball 24, such as, without limitation, a joystick, a touchpad, a touch-sensitive display, and hard buttons (including a button or buttons devoted to camera-related functions) disposed on the housing 6 of the electronic device 4. The illustrative output apparatus 12 comprises a display 32.

The processor 16 controls overall operation of the electronic device 4. For example, the processor 16 processes and controls voice communication as well as data communications.

As can be seen in FIG. 2, the processor apparatus 16 comprises a processor 36 and a memory 40. The processor 36 may be of any of a wide variety of processing devices, including and without limitation, microcontrollers, microprocessors (μP), sequencers, digital signal processors or state machines implemented in hardware logic that interfaces with the memory 40. Processor 36 is responsive to inputs from the input apparatus 8 and provides output signals to the output apparatus 12.

The memory 40 can be said to constitute a machine-readable medium and can be any one or more of a variety of types of internal and/or external storage media such as, without limitation, RAM, ROM, EPROM(s), EEPROM(s), FLASH, and the like that provide a storage register for data storage such as in the fashion of an internal storage area of a computer, and can be volatile memory or nonvolatile memory. The memory 40 has stored therein a number of routines which are executable on the processor 36 for operating the electronic device 4. As employed herein, the expression "a number of" and variations thereof shall refer broadly to any nonzero quantity, including a quantity of one. Any of the components that consume electrical power can receive the power from a power source, represented in FIG. 2 as a battery 38.

Figure 3:
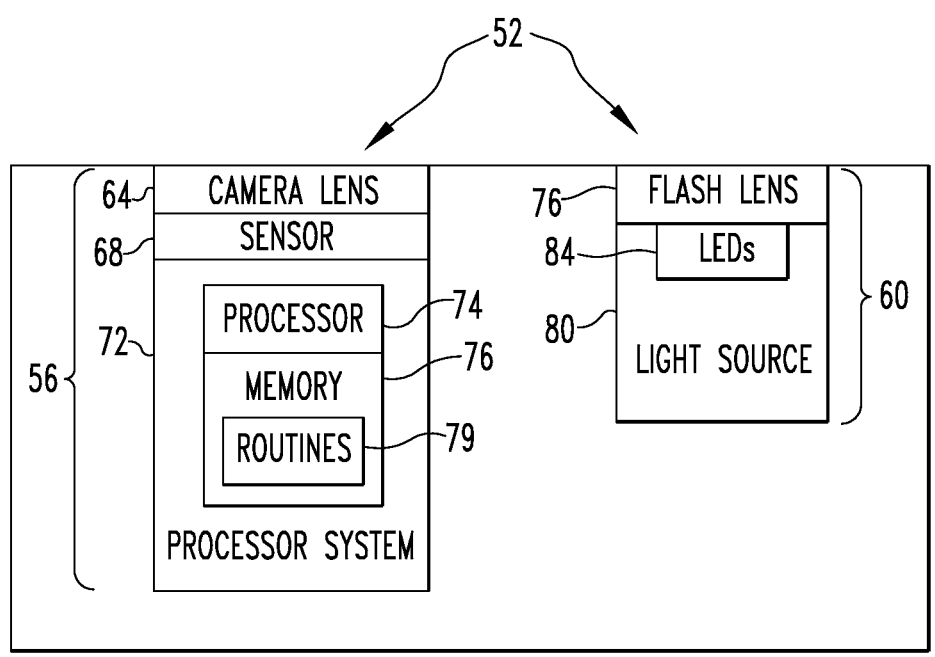
FIG. 3 is a schematic depiction of a camera apparatus in accordance with the disclosed and claimed concept that can be incorporated into the handheld electronic device of FIG. 1.

Referring to FIGS. 1 and 3, the electronic device 4 further includes as an input apparatus 8 a camera apparatus 52 disposed on or in the housing 6 for taking pictures and/or video. The camera apparatus 52 is considered to comprise a camera 56 and a flash 60, although the camera 56 and the flash 60 can be separate components (e.g., the flash may be removable from the camera). The camera 56 may be a modular device that comprises a camera lens assembly 64, a sensor 68, and a processor system 72. As employed herein, the expression "modular" shall refer broadly to a self-contained device that is, for instance, purchased and/or installed and/or operable in some fashion as a self-contained unit. As a general matter, the lens assembly 64 may overlie the sensor 68 which is mounted to a printed circuit board upon which is disposed the processor system 72. However, other modular configurations can be employed without departing from the present concept.

The lens assembly 64 is used to focus an image of a scene that is detected by the sensor 68, which generates an image signal as a function of the detected image. The sensor 68 then communicates the image signal, which is representative of the image, to processor system 72 for further handling (e.g., without limitation, storing the image if desired by the user taking a photograph, using the image or a part of the image to perform other functions as further described below). As used herein, the term "scene" shall be used to refer to the entire image that would be captured by the camera apparatus 52 at a given time. In an illustrative embodiment, during video recording operations the sensor 68 captures a number of successive images or "frames" of the scene and communicates a signal representative of each successive frame to the processor system 72.

Similar to the processor apparatus 16 previously discussed, processor system 72 may comprise a processor 74 and a memory 76. Processor 74 may be any of a wide variety of processing devices, including and without limitation, microcontrollers, microprocessors (μP), sequencers, digital signal processors or state machines implemented in hardware logic that interfaces with the memory 76. The memory 76 can be said to constitute a machine-readable medium and can be any one or more of a variety of types of internal and/or external storage media such as, without limitation, RAM, ROM, EPROM(s), EEPROM(s), FLASH, and the like that provide a storage register for data storage such as in the fashion of an internal storage area of a computer, and can be volatile memory or nonvolatile memory. The memory 76 has stored therein a number of routines 79 that are executable on the processor 74 for operating the camera apparatus 52 including, for example without limitation, a routine for carrying out the method described below as well as other routines related to operation of camera apparatus 52. Although depicted as distinct elements, the processor system may be included within elements previously described. For example, the processor 74 in FIG. 3 may be the same as (or included in) the processor 36 shown in FIG. 2, and the memory 76 in FIG. 3 may be the same as (or included in) the memory 40 in FIG. 2. The concepts described herein are not limited to any particular arrangement of electronic circuitry.

The flash 60 typically comprises a flash lens 76 and a light source 80 that similarly can be of a modular nature. The flash lens 76 typically is a Fresnel lens that tends to direct light rays in a focused manner in a particular general direction (generally toward a scene being recorded). The illustrative light source 80 comprises a number of LEDs 84. LEDs 84 may be of any suitable color as the disclosed concept is not necessarily limited to light sources of any particular color. A visual indication of video recording operations, as described below, may be provided by one or more of LEDs 84. For purposes of the discussion that follows, it will be assumed that the visual indication is provided by the flash 60 in general, rather than a specific component thereof.

Camera apparatus 52 may be any of a variety of commercially available camera modules fabricated by a variety of manufacturers for the purpose of being incorporated into other devices, such as the handheld electronic device 4. Sensor 68 may be one of a variety of available charge coupled devices (CCD), complimentary metal oxide semiconductor (CMOS) imaging devices, or another suitable form of device capable of receiving a light signal of an object to be photographed and converting the light signal input through lens assembly 64 into an electrical image signal, which is then transmitted to processor system 72.

When handheld electronic device 4 is used to record a video, the processor 16 of the electronic device 4 typically sends a signal to processor system 72 of the camera apparatus 52 responsive to an indication by a user of the device 4 that a video is to be recorded. Processor 74 of processor system 72 then generally accesses memory 76 to retrieve and execute a sequence of instructions from one or more routines stored therein, thereby causing processor 74 to operate camera apparatus 52 to scan and record a number of frames, as previously discussed, and control light source 80 as detailed below. During such recording, processor 74 may control/adjust a number of attributes or characteristics related to the recording operation, and more particularly to the frames being recorded. Such attributes may include, for example without limitation, "frame rate" and "exposure time".

As used herein, the term "frame rate", or frame frequency, shall refer to the frequency (rate) at which an imaging device, such as camera apparatus 52, produces unique consecutive images called frames. Increasing frame rate causes more frames to be recorded in a given time frame, thus reducing the time between consecutive frames (assuming constant exposure time), while decreasing frame rate causes less frames to be recorded in a given time frame, thus increasing the time between consecutive frames (assuming constant exposure time).

As used herein, the term "exposure time" shall refer to the length of time that image sensor 68 detects or "sees" the scene being captured in a frame. Increasing exposure time causes the length of time for any given frame to be captured to be increased, thus reducing the time between consecutive frames (assuming constant frame rate), while decreasing exposure time causes the length of time for any given frame to be captured to be decreased, thus increasing the time between consecutive frames (assuming constant frame rate).

Figure 4:
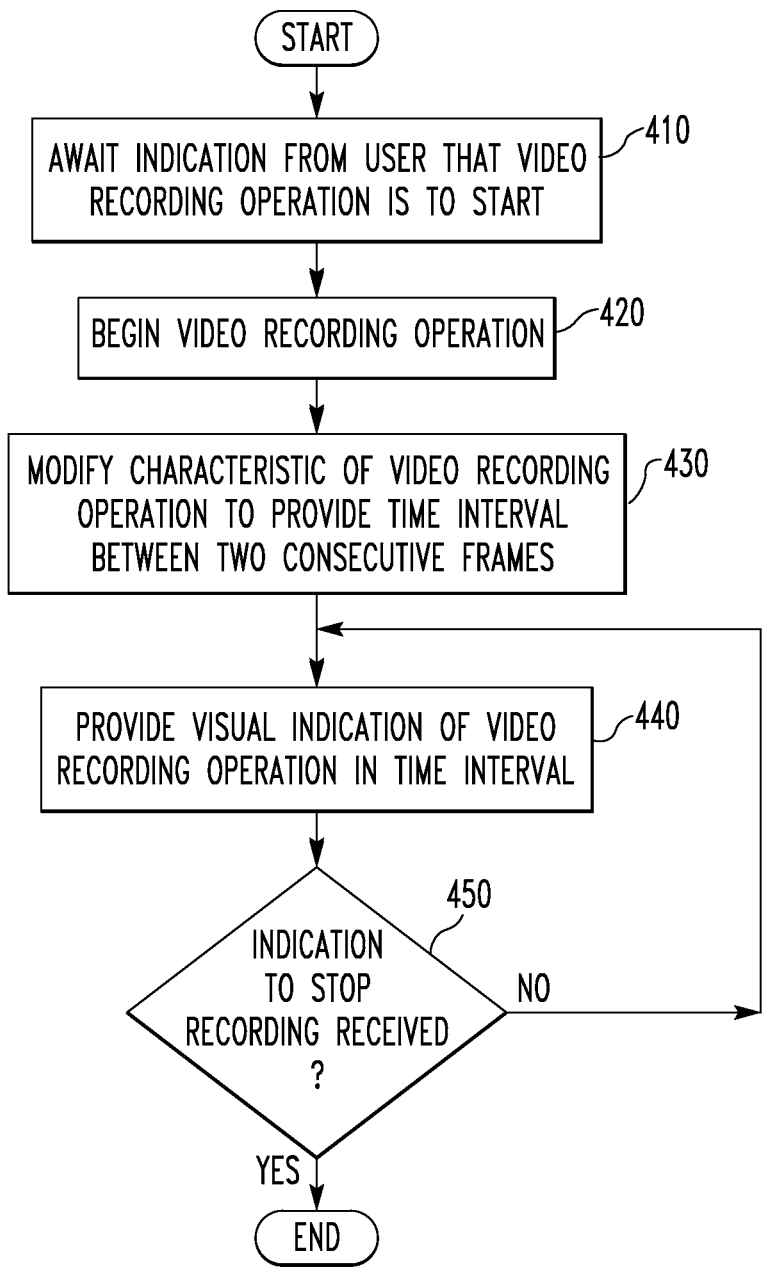
FIG. 4 is a flowchart depicting an embodiment of an improved method in accordance with the disclosed and claimed concept.

FIG. 4 is a flow chart of an embodiment of a method that can be carried out by a handheld electronic device 4 including a camera apparatus 52 having a processor system 72 and a flash 60 being used to record a video in accordance with the concept disclosed herein.

Starting at 410, the electronic device 4 awaits an indication from a user of the electronic device 4 that a video recording operation is to start. Such indication may be supplied, for example without limitation, by the user actuating an input device 8 disposed on the housing 6 of the electronic device 4, setting a timer, selecting a video camera function or another mechanism under the user's control. After such indication is received, a video recording operation commences at 420 (the recording may commence immediately, for example, or after a delay, or in response to a further event such as a verbal command or sensed motion). As previously discussed, the video recording operation will generally be performed according to a number of characteristics, for example, the individual frames that together make up the video will each be recorded using an exposure time generally determined by the processor 74 and the sequence of frames will recorded at a frame rate which is also generally determined by the processor 74.

In order to avoid having the flash 60 (or the illuminated light source 80 of flash 60) appear in the video recording, processor 74 next modifies one or more of the characteristics of the video recording to create (or provide) a time interval of suitable duration between two subsequent frames, as shown at 430. Such modification may include, for example without limitation, slightly reducing the exposure time of a number of frames, thus increasing the time interval between such frames or by adjusting the rate at which the frames are being recorded (frame rate). Such adjustment to the frame rate may include reducing the frame rate or eliminating a number of frames. In general, modifying a characteristic of the video recording operations comprises altering or changing one of the characteristics from its ordinary operating qualities so that a time interval can be created. During the time interval, the visual indication of recording is provided by blinking the flash 60, but no recording is made while the flash 60 is illuminated. As a result, the visual indication provided by the flash 60 is less likely to appear in the video recording. In a typical implementation, it may be advantageous to keep a characteristic operating normally except when the characteristic is modified to create the time interval.

Once a suitable time interval has been established in 430, flash 60 is then illuminated during the interval, as shown in 440, and thus does not appear in any of the recorded frames. The flash 60 is illuminated intermittently or periodically, to create a blinking visual indicator light that indicates that video recording is taking place.

The recording process then continues with the periodic display of flash 60 during the created intervals until an indication by the user is received, as shown at 450, that the recording operation is to stop. Such indication may be generated by the user actuating an input device 8 disposed on the housing 6 of the electronic device 4, setting a timer, or by another mechanism under the user's control.

In an illustrative embodiment, the indicator (illuminated flash 60) is provided once per second (that is, the default period of the blinking is about one blink per second). The frequency of the indicator may be adjusted, however, depending on user or application preferences, or due to other factors (such as regulation or standards that dictate or recommend a different flashing frequency).

The concept includes providing two or more time intervals between the recording of consecutive frames, by modifying at least one of the characteristics of the video recording operations, providing the visual indication of video recording operations during the time interval. For example, an embodiment may provide creating a first time interval between the recording of a first set of consecutive frames, and blinking the flash 60 during that first time interval, then promptly creating a second time interval between the recording of a second set of consecutive frames, and blinking the flash again during that second time interval. Any number of time intervals may be generated in similar fashion, and the flash 60 blinked during the intervals. The perceived effect to a person might be that the indicator blinks once per time period (such as once per second), but each "blink" is actually a series of much shorter duration blinks.

Illustrative embodiments of the present concept can also comprise computer readable codes on a computer readable storage medium. The computer readable storage medium can comprise any data storage device that can store data or instructions that can be read or executed by a computer system or a component thereof, such as a processor. Examples of a computer readable medium include magnetic storage media (such as, ROM, floppy disks, hard disks, among others), optical recording media (such as, CD-ROMs, or DVDs), and storage mechanisms such as carrier waves (such as, transmission through the Internet). The computer readable medium can also be distributed over network coupled computer systems so that the computer readable code is stored and executed in a distributed fashion. Also, functional programs, codes, and code segments for accomplishing illustrative embodiments of the present invention can be construed by programmers of ordinary skill in the art to which the present invention pertains.

One or more of the embodiments and variations described above may realize one or more advantages, some of which may have been already indicated. Improved video quality may result, as light emitted by the flash 60 as an indication of video recording is less likely to appear in the video recording. Light emitted by the flash 60 may thereby indicate that video recording is taking place while leaving a smaller artifact in the video being recorded. A smaller artifact may reduce or eliminate a need or desire for post-processing to deal with such an artifact.

While specific embodiments of the disclosed and claimed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed and claimed concept which is to be given the full breadth of the claims appended and any and all equivalents thereof.

What is claimed is:

1. A method of providing a visual indication of the occurrence of video recording operations on an electronic device including a camera for video recording, the video recording operations including recording a plurality of frames according to a number of characteristics, the method comprising:
    providing a time interval between the recording of two consecutive frames by modifying at least one of the characteristics of the video recording operations performed during each of the consecutive frames and not during the time interval between the consecutive frames; and
    providing the visual indication of the occurrence of the video recording operations during said time interval between the consecutive frames and not during the video recording operations.

2. The method of claim 1 wherein the number of characteristics include a frame rate and wherein modifying at least one of the characteristics of the video recording operations comprises adjusting the frame rate.

3. The method of claim 2 wherein adjusting the frame rate comprises decreasing the frame rate.

4. The method of claim 3 wherein decreasing the frame rate comprises eliminating a number of frames.

5. The method of claim 1 wherein the number of characteristics include exposure time and wherein modifying at least one of the characteristics of the video recording operations comprises adjusting the exposure time of a number of frames.

6. The method of claim 5 wherein adjusting the exposure time comprises reducing the exposure time.

7. The method of claim 1 wherein the electronic device includes a flash apparatus having a focused light source and wherein providing the visual indication of video recording operations comprises illuminating the flash apparatus.

8. The method of claim 7 wherein illuminating the flash apparatus comprises illuminating a number of LEDs.

9. An electronic device comprising:
   a camera apparatus having a processor, a memory, and a flash apparatus, the camera apparatus being adapted to perform a video recording operation having a number of characteristics, the video recording operation including recording a number of frames, the processor being adapted to:
   provide a time interval between the recording of two consecutive frames by modifying at least one of the characteristics of the video recording, the video recording operation performed during each consecutive frame and not during the time interval between the consecutive frames; and
   provide visual indication indicating recording of video by illuminating the flash apparatus between the consecutive frames and not during the video recording operation.

10. The electronic device of claim 9 wherein the number of characteristics include a frame rate and wherein the processor is further adapted to modify at least one of the characteristics of the video recording by adjusting the frame rate.

11. The electronic device of claim 10 wherein the processor is further adapted to adjust the frame rate by decreasing the frame rate.

12. The electronic device of claim 11 wherein the processor is further adapted to decrease the frame rate by eliminating a number of frames.

13. The electronic device of claim 9 wherein the number of characteristics include exposure time and wherein the processor is further adapted to modify at least one of the characteristics of the video recording by adjusting the exposure time.

14. The electronic device of claim 9 wherein the flash apparatus comprises a number of LEDs.

15. A non-transitory machine readable storage medium that provides instructions which, when executed on an electronic device of a type including a camera apparatus having a processor, a memory, and a flash apparatus, the camera apparatus being adapted to perform a video recording operation having a number of characteristics, the video recording operation including recording a number of frames, cause the processor to perform operations comprising:
   providing a time interval between the recording of two consecutive frames by modifying at least one of the characteristics of the video recording, the video recording operation performed during each of the consecutive frames and not during the time interval between the consecutive frames; and
   providing a visual indication indicating recording of video by illuminating the flash apparatus between the consecutive frames and not during the video recording operation.

* * * * *